Dec. 26, 1939.  H. MUELLER ET AL  2,184,865
GUIDE DEVICE FOR BLADE PROPELLERS
Filed Aug. 3, 1938   3 Sheets-Sheet 1

INVENTORS
HANS MUELLER & ERNST SCHNEIDER

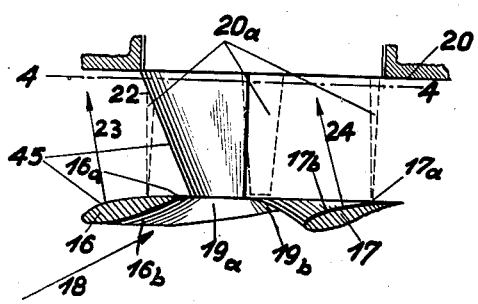
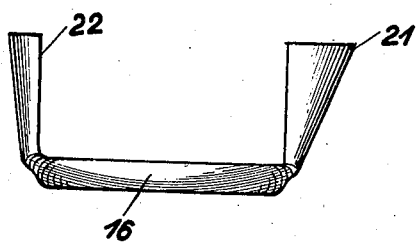
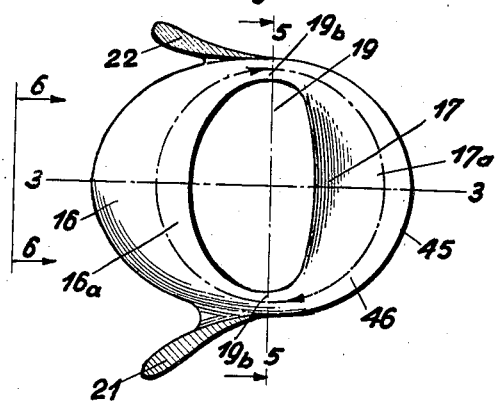
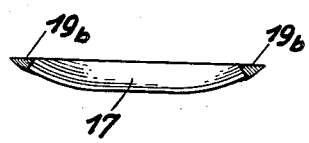
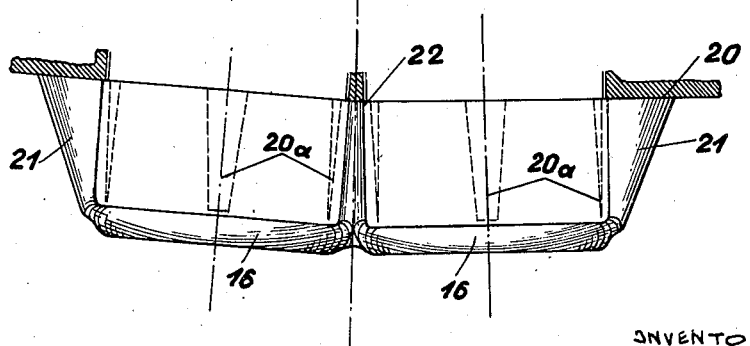

INVENTORS
HANS MUELLER & ERNST SCHNEIDER
BY C. P. Goepel.
ATTORNEY.

Patented Dec. 26, 1939

2,184,865

UNITED STATES PATENT OFFICE 2,184,865

GUIDE DEVICE FOR BLADE PROPELLERS

Hans Mueller, Heidenheim-on-the-Brenz, and Ernst Schneider, Vienna, Germany, assignors to Voith-Schneider Propeller Company, New York, N. Y., a corporation of New York Application August 3, 1938, Serial No. 222,884
In Austria August 6, 1937

20 Claims. (Cl. 115—42)

This invention relates to Voith-Schneider propellers for ships, etc., which are positioned in the hull and in which blades are rotated around a perpendicular or inclined axis, the blades themselves being disposed circumferentially around said axis of the propeller, and rotatable on their axes parallel with or substantially parallel with the axis of the propeller.

The length of such blades is generally determined by the depth displacement of the ship and by the depth of the waters in which the ship is intended to be used. The necessary total blade surface and cavitation also come into consideration. Decrease in width of blades and consequent increase of the number of blades is limited by construction requirements, by expense, and by unsatisfactory action of the blades. It is known that the contour eddy resistance increases with increase of width of blade relative to blade length.

In the operation of the blades, injurious contour or edge eddies at the ends of the blades are brought into existence, due to the difference in pressure between the suction and pressure sides of the blades, particularly at the ends. One object of this invention is to provide means for overcoming the injurious effects of such eddies, and to convert them to a useful purpose.

Propellers of this kind produce a flow of the water which becomes more restricted and hence stronger proportionately to the load on the propeller. The flow produced has generally a square or rectangular cross-section, but a substantial concentration of the flow does not take place in horizontal direction, but essentially in perpendicular direction, and even then not equally at the top and bottom portions, but mainly at the bottom portion, while the flow of the top portion contacts with the bottom of the hull, the flow converging towards the bottom of the hull. Another object of the invention is to avoid the objectionable effects of this flow, and to convert it to a useful purpose to increase the efficiency of the propeller.

The invention has further for its object to utilize such flow in such a manner as to increase the forward thrust of the propeller.

To carry out these objects, the invention consists in means disposed adjacent to and below the lower ends of the blades for providing a subpressure zone; in means for guiding the water flow to the front blades, and means for guiding the water flow to the rear blades; in means joining said front blade guide means and rear blade guide means; in means inclined in respect to the water flow to guide the same to the blades; in means forming part of the last-named means for adapting the same to the water flow; in the means of shaping such means in the form of drop-shaped contours; and finally in the means supporting all of the aforesaid, severally and jointly, to the hull of the vessel.

The invention will be more fully described in the light of the embodiments thereof shown in the drawings, and will be finally pointed out in the claims.

In the accompanying drawings:

Figure 3 is a perpendicular section of the improved guide device applied to a hull, having such a propeller, taken on line 3—3 of Figure 4;

Figure 4 is a horizontal section taken on line 4—4 of Figure 3, and showing the path of the blades in respect thereto;

Figure 5 is a front view partially in section taken on line 5—5 of Figure 4;

Figure 6 is a front view from line 6—6 of Figure 4;

Figure 7 shows an end view diagrammatically of two guide devices when two propellers are used;

Similar characters of reference indicate corresponding parts throughout the various views.

Figure 1:
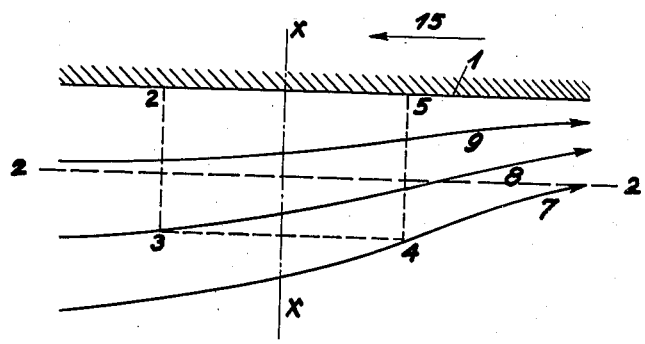
Figure 1 is a side view of the bottom surface of a hull having a Voith-Schneider propeller applied thereto, and showing the flow of the water in respect thereto.
Figure 2:
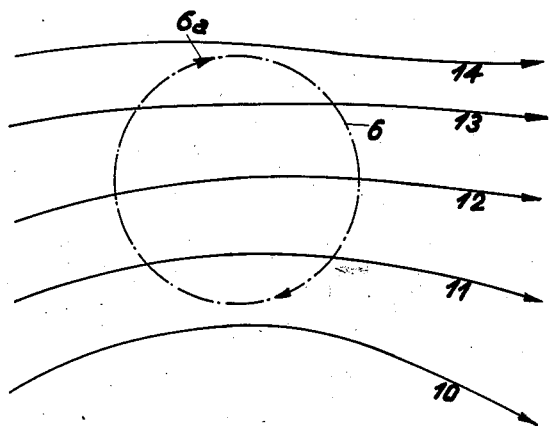
Figure 2 is a plan view of the path of the blades of such a propeller, and a plan view of the water flow shown in Figure 1, taken on line 2—2 of Figure 1.

Referring to the drawings, and more particularly Figures 1 and 2, the hull 1 supports a propeller diagrammatically indicated by 2—3—4— and 5, and the path of the blades is shown by the dot-dash circle 6 in Figure 2, in the direction of the arrow 6a. The line 3—4 indicates the horizontal path of the lower ends of the blades. When the propeller rotates in free water it generates a current or water flow indicated by the stream lines 7, 8 and 9, in Figure 1, and by the lines 10, 11, 12, 13 and 14 in Figure 2. The shape of the lines 7 to 9 and their arrangement in respect to the hull is shown by the rearwardly upwardly disposed converging of the stream lines, and the lines 10 to 14, the rearwardly and laterally disposed divergence at one side of the propeller, the other side generally indicated by line 14 being substantially straight, the water flow forward of the propeller converging towards the propeller, the various lines having different curvatures. It follows that due to the convergence shown in Figure 1, more water flows through the rear half of the propeller (shown at the right side of Figure 1) than through the front half. The rearward divergence of the lines depends upon the direction of rotation of the propeller, and in Figure 2 the direction of rotation being shown by arrow 6a, the line 10 has the greatest lateral divergence, the ship moving in the direction of the arrow 15 of Figure 1.

In order to utilize this water flow, without destroying the same, for the purpose of obtaining a most favorable attack of the blades upon the water, and at the same time provide a forward thrust, in aid of the direction of the ship, and at the same time provide a sub-pressure field for the ends of the blades to avoid cavitation, an improved water flow guide device is provided.

Figure 8:
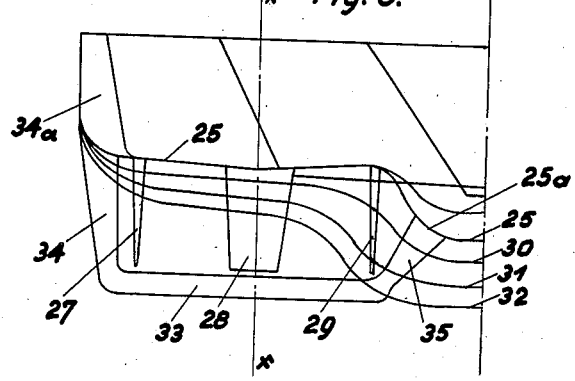
Figure 8 shows diagrammatically the left half of the stern of a hull with propeller applied thereto, and the improved guide device supported thereon, the body plan of the stern being shown.
Figure 9:
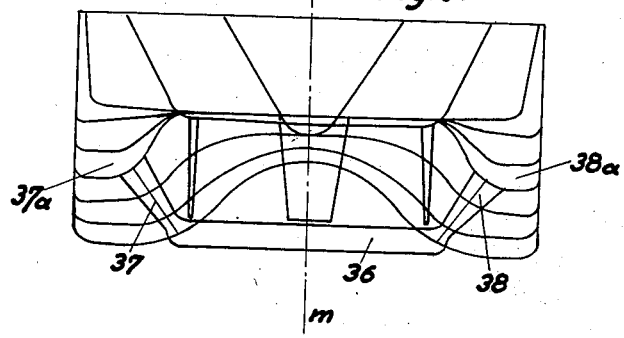
Figure 9 is a body plan rear view of the stern of the hull, which is provided with a trough-like form.
Figure 10:
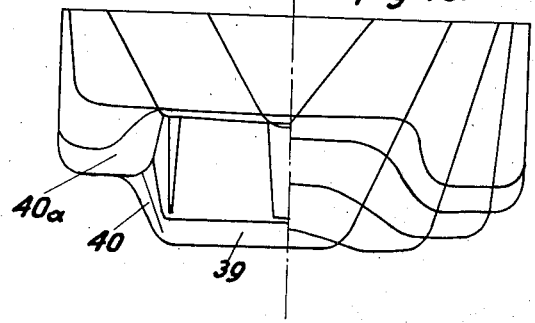
Figure 10 shows a body plan of the hull, at the left side a rear view up to the cross-section middle plane of the propeller, and at the right side section lines to the middle of the ship and to the bow.

In Figure 8 this guide device 33 has an upright 34 secured to the stern 34a of the hull, and another upright 35 secured to the hull along its bulge 25a. In Figure 9, the guide device 36 has uprights 37 and 38 secured to the hull at each side of the stern portion on the bulges 37a and 38a. In Figure 10 the guide device, of which only one-half is shown, has its one upright 40 secured to the bulge 40a of the hull. In Figures 8, 9 and 10 the guide devices are shown diagrammatically to show the relative position to the hull.

The improved guide device is shown in Figures 3, 4, 5 and 6. The guide device generally indicated by 45 here shown consists of supporting standards 21 and 22, and a ring plate 46. The standards or uprights are secured at their upper ends to the hull 20, and at their lower ends are either secured to or made part of the ring plate. The standards 21 and 22 have a streamline cross-section, blunt in the front and tapering to the rear, as shown in Figure 4, and are not symmetrically disposed, but are shaped in the light of the streamlines shown in Figure 2, the standard 22 being slightly curved so as to endeavor to catch the line 14, as an example, and the standard 21 having a greater outward curving so as to endeavor to catch the stream line 10. These standards then act as catch-alls for as many of the laterally disposed stream lines as possible.

The ring plate 46 consists of two streamlined portions, 16 and 17, both blunt in the front and tapering to the rear, and each is curved downwardly from the upper plane of the ring plate 46. The upper planes 16a and 17a of these portions 16 and 17 are substantially in the plane of rotation of the lowermost tips of the blades 20a of the propeller, there being a small space therebetween as seen in Figure 3. There is a space 19 in the ring plate 46 disposed between the rear edge of the front portion 16 and the front edge of the rear portion 17, preferably of greater width than depth. From Figure 3, it will be seen that the opening 19 of Figure 4 is the upper discharge opening of a channel 19a formed by the rear concave surface 16b of the portion 16, and front convex surface 17b of the portion 17, the narrowed connecting ring portion 19b being between the two portions 16 and 17. The front portion 16 has a convex front surface, and the rear portion 17 has a concave rear portion. The general contour of the portions 16 and 17, and to some extent the contour of the standards 21 and 22, is in the nature of elongated drops of descending water. The front portion 16 is in part below the front half of the blades of the propeller, and the rear portion 17 is in part below the rear half of the blades of the propeller.

Referring again to the converging stream shown in Figure 1, the ring plate 46 is so arranged in respect thereto that the front portion 16 guides the stream line 7 upwardly into the front half of the blades, and the rear portion 17 guides the water above the stream line 7 upwardly to the rear half of the blades, the general direction of the modified stream flow being indicated by the arrow 18. The front guide surfaces of portions 16 and 17 are in front of the front and rear half of the blades to a considerable extent, and the guide surfaces then merge into the plan of rotation of the lower ends of the blades, with a suitable clearance therebetween. The shape of the standards 21 and 22 at their rear ends merges into the ring plate 46 in a sharpened tapering edge, and this shape as also that of the front and rear portions 16 and 17, gives a smooth flow to the water without any abruptness, and in consequence of their shape a freedom of flow without reactions at the tapering ends takes place. The portions 16 and 17 act like a double decker, in that on the forward guide surfaces, also on the sides opposite the ends of the blades, a suction action of the water takes place with consequent acceleration of the water in view of the action of the blades. There is thereby produced upon these forward surfaces of portions 16 and 17 a sub-pressure field, with a waterfall in the direction of the water flow, and thereby there are created upon the guide surfaces of the portions 16 and 17 forces directed upwardly, which act upon the guide surfaces in advance of the blades, these forces being indicated by the arrows 23 and 24. It is known as a scientific fact that a convex surface exposed to a water flow is moved towards the water flow, and this is generally recognized as a suction action. This line of force indicated by the arrows 23 and 24 has a component in the direction of the arrow 15 of Figure 1, or in the direction of movement of the hull, and thereby the forward thrust of the propeller is augmented, since the forward component or impelling force acting through the standards 21 and 22 upon the hull aids in its movement.

For the purpose of explaining the principle underlying the invention, the ring plate 46 has been shown in one piece, supported by two standards. For larger sized guide devices, more than two standards can be provided, but in each case their arrangement must be such as to be pressed on, so to say, to the streamline generated by the blades. Should the portions 16 and 17 be separated so as to act without the connecting portions 19b, similar standards would be provided. Again, each of the guide surfaces 16 or 17 can be divided. In some cases, only one portion, either the front or the rear portion can be used. Again, either one or more guide surfaces can be arranged below the front half of the blades or below the rear half of the blades. In any event, as stated before, the standards must be so arranged as to press on, so to say, the water flow. In the case of two or more propellers next to each other, the ring plates and standards can be suitably joined. A two propeller form is diagrammatically shown in Figure 7.

Should the propeller be operated for forward thrust in the direction opposite to that shown in Figure 2, then the flow lines would be correspondingly changed, and the standards 21 and 22 would be changed accordingly. The standards 21 and 22, and portions 16 and 17 can be made adjustable to adapt the guide device to different flow conditions. The amount of convergence of the waterfall is proportional to the load on the propeller.

The velocity of the rotation of the blade is about one to three times as great as the velocity of the ship.

The clearance between the adjacent ring plate surface and the lowermost ends of the blades is very small, so that an equalization between the pressure and suction sides of the blades is impossible, and therewith the edge eddy resistance is decreased. The surface of the ring plate 46, along the rotary path of the blades indicated in Figure 4 by the circle of dot-dash outline, is on a horizontal plane parallel with and spaced a clearance distance from the path plane of the lower ends of the blades.

The general operation of the improved guide device for propellers is to embrace the water flow created below the hull where the blade propeller rotates, and instead of destroying it, turning it to a useful purpose to concentrate the water flow acted upon by the blades. The flow is guided in such a manner as to create a component acting in the direction of the forward thrust of the propeller. The flow is guided also in such a way as to prevent cavitation at the lower ends of the blades. In other words, the injurious edge eddies on the ends of the blades of blade propellers created by the pressure differences between the suction and pressure sides of the blades, particularly at their ends, is substantially obviated.

In Figure 8 the vertical body plan of the stern of a hull is shown which is shaped to form a trough-like channel for the blade propellers, two being used, each seated in a trough-like channel. The frame line 25 passes through the axis x—x of the propeller, of which three blades, 27, 28 and 29, are shown. The frame lines 30, 31 and 32 show the outline of the hull passing from the stern to amidships. The standard 34 is substantially vertical, while the other standard 35 is inclined and extends in the direction of the longitudinal center line of the ship. The inclined position of the standard 35, and its securing to the rounded portion 25a, enables a shorter length of standard to be used.

In Figure 9 the rear or stern body plan is shown which is formed trough-like at the center line to enable a blade propeller to be placed therein, the axis m—m of which is in the longitudinal center line of the hull. Both standards 37 and 38 are inclined. The trough-like channel is bridged over by the guide device 36 with its standards. The trough-like channel may extend along the bottom of the hull towards the middle portion thereof, and to the bow thereof, and then forms a double keel.

In Figure 10 there are two body plans, one of the stern portion to the middle of the ship at the left, and the other at the right, from the middle of the ship to the bow. The frame lines in this case are so formed that the keel divides itself at the bow and thereby forms a double keel. The guide device 39 has inclined standards 40, and bridges the portions of the hull forming the trough in which the blade propeller is placed.

The trough-like channel in the hull of the ship serves further to converge the flow of water towards the propeller, and this again is further directed to the propeller by the improved guide device.

It is obvious that various changes and modifications may be made in the details of construction and design of the above specifically described embodiments of this invention without departing from the spirit thereof, such changes and modifications being restricted only by the scope of the following claims.

I claim:

1. A guide device for a hull having a blade propeller having blades disposed circumferentially around an axis rotatable in an orbit of said axis, with each blade shiftable on its own axis, which is substantially parallel with the axis of the orbit, comprising a ring plate and a standard for supporting the ring plate to the hull, said ring plate being disposed with a clearance adjacent the lower ends of the blades and in a plane substantially perpendicular to the orbit axis of the propeller, and said ring plate having water flow directing means extending forwardly and downwardly of the plane of the ring plate for converging the water flow to the blades of the propeller.

2. A guide device for a hull having a blade propeller having blades disposed circumferentially around an axis rotatable in an orbit of said axis, with each blade shiftable on its own axis, which is substantially parallel with the axis of the orbit, comprising a ring plate and a standard for supporting the ring plate to the hull, said ring plate being disposed with a clearance adjacent the lower ends of the blades and in a plane substantially perpendicular to the orbit axis of the propeller, and said ring plate having water flow directing means extending forwardly and downwardly of the plane of the ring plate for converging the water flow to the blades of the propeller, said last-named means having a convex forward surface.

3. A guide device for a hull having a blade propeller having blades disposed circumferentially around an axis rotatable in an orbit of said axis, with each blade shiftable on its own axis, which is substantially parallel with the axis of the orbit, comprising a ring plate and a standard for supporting the ring plate to the hull, said ring plate being disposed with a clearance adjacent the lower ends of the blades and in a plane substantially perpendicular to the orbit axis of the propeller, and said ring plate having water flow directing means extending forwardly and downwardly of the plane of the ring plate for converging the water flow to the blades of the propeller, said last-named means having a convex forward surface, and said standard having a contour broad at the front and tapering to the rear.

4. A guide device for a hull having a blade propeller having blades disposed circumferentially around an axis rotatable in an orbit of said axis, with each blade shiftable on its own axis, which is substantially parallel with the axis of the orbit, comprising a ring plate having a horizontal surface spaced by a clearance from the lower ends of the blades said horizontal surface being in a plane substantially perpendicular to the orbit axis of the propeller, a vertical water converging portion extending forwardly and laterally of the ring plate for directing the water to the blades, a horizontal water converging portion extending forwardly and downwardly of the ring plate for directing the water to the blades, and means supporting the ring plate to the hull.

5. A guide device for a hull having a blade propeller having blades disposed circumferentially around an axis rotatable in an orbit of said axis, with each blade shiftable on its own axis, which is substantially parallel with the axis of the orbit, comprising a ring plate having a horizontal surface spaced by a clearance from the lower ends of the blades said horizontal surface being in a plane substantially perpendicular to the orbit axis of the propeller, a vertical water converging portion extending forwardly and laterally of the ring plate for directing the water to the blades, a horizontal water converging portion extending forwardly and downwardly of the ring plate for directing the water to the blades, and means supporting the ring plate to the hull, the vertical and horizontal portions being streamlined blunt in the front and tapering to the rear.

6. A guide device for a hull having a blade propeller having blades disposed circumferentially around an axis rotatable in an orbit of said axis, with each blade shiftable on its own axis, which is substantially parallel with the axis of the orbit, comprising a ring plate having a surface parallel with the plane passing through the lowermost ends of the blades, said surface being in a plane substantially perpendicular to the orbit axis of the propeller, and spaced therefrom, vertically disposed means extending forwardly and laterally of the ring plate for converging the water flow towards the blades, and horizontally disposed means extending forwardly and downwardly of the ring plate for converging the water flow towards the blades.

7. A guide device for a hull having a blade propeller having blades disposed circumferentially around an axis rotatable in an orbit of said axis, with each blade shiftable on its own axis, which is substantially parallel with the axis of the orbit, comprising a ring plate having a surface parallel with the plane passing through the lowermost ends of the blades and spaced therefrom, said surface being in a plane substantially perpendicular to the orbit axis of the propeller, vertically disposed means extending forwardly and laterally of the ring plate for converging the water flow towards the blades, and horizontally disposed means extending forwardly and downwardly of the ring plate for converging the water flow towards the blades, said vertically and horizontally disposed means being streamlined, blunt in the front and tapering to the rear.

8. A guide device for a hull having a blade propeller having blades disposed circumferentially around an axis rotatable in an orbit of said axis, with each blade shiftable on its own axis, which is substantially parallel with the axis of the orbit, comprising a ring plate disposed adjacent the lower most ends of the said blades, said ring plate being in a plane parallel with and spaced from the plane passing through the lowermost ends of the blades, to form a sub-pressure field for the blades, a convex forward surface portion extending forwardly of the forward surface portion and extending downwardly therefrom in advance of the blades for guiding the water to the forward blades and creating a force component in the direction of the movement of the hull, a second convex rearward surface portion extending forwardly of the rearward part of the ring plate and downwardly therefrom and spaced from the forward surface portion, said ring plate having an opening between the forward and rearward surface portions, said rearward surface portion creating a force component in the direction of the movement of the hull, and means adapted to support the ring plate to the hull.

9. In a guide device for a hull having a blade propeller having blades disposed circumferentially around an axis rotatable in an orbit of said axis, with each blade shiftable on its own axis, which is substantially parallel with the axis of the orbit, having a ring plate having a surface adapted to be spaced from and arranged parallel with the plane of the lowermost ends of the blades, supporting members for the ring plate adapted to be secured to the hull, each supporting member disposed to extend laterally and forwardly of the ring plate to press on the lateral sides of the water flow converging towards the propeller.

10. In a guide device for a hull having a blade propeller having blades disposed circumferentially around an axis rotatable in an orbit of said axis, with each blade shiftable on its own axis, which is substantially parallel with the axis of the orbit, having a ring plate having a surface adapted to be spaced from and arranged parallel with the plane of the lowermost ends of the blades, means adapted to support the same to a hull, said ring plate having spaced water converging members each extending forwardly of the ring plate, certain of them extending laterally outwardly of the ring plate and others downwardly of the ring plate, to direct the water flow towards the propeller.

11. The combination of a hull having a trough-like channnel, a blade propeller disposed therein, having blades disposed circumferentially around an axis rotatable in an orbit of said axis, with each blade shiftable on its own axis, which is substantially parallel with the axis of the orbit, and a guide device having a surface adapted to be spaced from and arranged parallel with the plane of the lowermost ends of the blades, and having means for supporting it to the hull and bridging the trough formed by the hull, said guide device having a member extending forwardly of the blades and downwardly therefrom and other members extending laterally outwardly from the blades.

12. The combination of a hull having a trough-like channel extending along the hull forming a double keel, a blade propeller disposed therein, having blades disposed circumferentially around an axis rotatable in an orbit of said axis, with each blade shiftable on its own axis, which is substantially parallel with the axis of the orbit, and a guide device having a surface adapted to be spaced from and arranged parallel with the plane of the lowermist ends of the blades and having means for supporting it to the hull and bridging the trough formed by the hull, said guide device having portions extending forwardly and downwardly therefrom and other portions forwardly and laterally outward thereof.

13. The combination of a hull, a blade propeller supported thereby having blades disposed circumferentially around an axis rotatable in an orbit of said axis, with each blade shiftable on its own axis, which is substantially parallel with the axis of the orbit, and forming a water flow converging vertically towards the hull and laterally away from the blades, and a guide device having water converging upright members having portions extending forwardly and laterally outward of the guide device to direct the lateral water flow to the blades of the propeller and having horizontal water converging members extending forwardly and downwardly of the guide device at the forward part of the guide device, and forwardly and downwardly of the rear portion of the guide device, to direct the vertically converging water flow towards the blades.

14. The combination of a hull, a blade propeller supported thereby having blades disposed circumferentially around an axis rotatable in an orbit of said axis, with each blade shiftable on its own axis, which is substantially parallel with the axis of the orbit, and forming a water flow converging vertically towards the hull and laterally away from the blades, and a guide device having water converging upright members having portions extending forwardly and laterally outward of the guide device to direct the lateral water flow to the blades of the propeller and having horizontal water converging members extending forwardly and downwardly of the guide device at the forward part of the guide device, and forwardly and downwardly of the rear portion of the guide device, to direct the vertically converging water flow towards the blades, said vertical and horizontal members being streamlined blunt in the front and tapering to the rear, and a surface of the guide device being adjacent the free ends of the blades.

15. In a guide device for a hull having a blade propeller having blades disposed circumferentially around an axis rotatable in an orbit of said axis, with each blade shiftable on its own axis, which is substantially parallel with the axis of the orbit, a water converging member for the front half of the blades, said member having a portion extending forwardly of the blades and downwardly therefrom and having a convex shape, and means for supporting the member to the hull.

16. In a guide device for a hull having a blade propeller having blades disposed circumferentially around an axis rotatable in an orbit of said axis, with each blade shiftable on its own axis, which is substantially parallel with the axis of the orbit, a water converging member for the rear half of the blades, said member having a portion extending forwardly of the blades and downwardly therefrom and having a convex shape, and means for supporting the member to the hull.

17. In a guide device for a hull having a blade propeller having blades disposed circumferentially around an axis rotatable in an orbit of said axis, with each blade shiftable on its own axis, which is substantially parallel with the axis of the orbit, a water converging member for the front half of the blades, said member having a portion extending forwardly of the blades and downwardly therefrom and having a convex shape, and means for supporting the member to the hull, said last named means being formed to direct the water to the blades, said last named means extending laterally outwardly of the orbit of said blades.

18. In a guide device for a hull having a blade propeller having blades disposed circumferentially around an axis rotatable in an orbit of said axis, with each blade shiftable on its own axis, which is substantially parallel with the axis of the orbit, a water converging member for the rear half of the blades, said member having a portion extending forwardly of the blades and downwardly therefrom and having a convex shape, and means for supporting the member to the hull, said last named means being formed to direct the water to the blades, said last named means extending laterally outwardly of the orbit of said blades.

19. In a guide device for a hull having a blade propeller having blades disposed circumferentially around an axis rotatable in an orbit of said axis, with each blade shiftable on its own axis, which is substantially parallel with the axis of the orbit, a water converging member for the blades, having a convex surface extending forward of the blades and downwardly therefrom, against the flow of water for creating a force component in the direction of the movement of the hull, and means adapted to support said member to the hull.

20. A guide device for a hull, having a blade propeller having blades disposed circumferentially around an axis rotatable in an orbit of said axis, with each blade shiftable on its own axis, which is substantially parallel with the axis of the orbit, and said guide device having a surface arranged in a plane spaced from and substantially parallel with the plane passing through the lowermost ends of said blades, said guide device having an opening disposed below the orbit axis and having in the front of said axis a portion extending forwardly and downwardly to guide streams of water normally passing below the plane of the guide device towards the forward blades, and said guide device at the rear of said orbit axis having a portion extending forwardly and downwardly of the rear part of the guide device to direct streams of water normally below the plane of the guide device towards the rear blades, and vertically disposed stream catching members extending above the plane of the guide device and extending forwardly and laterally outwardly of the blades, one at each side of the guide device and one of said members being larger than the other, the larger one being placed at the side of the blades which move in the same direction as the direction of the ship, and said lateral members being adapted to be secured to the hull of the vessel of which the blade propeller is a part.

HANS MUELLER.
ERNST SCHNEIDER.